United States Patent [19]
Kuhn, Jr.

[11] Patent Number: 5,348,439
[45] Date of Patent: Sep. 20, 1994

[54] PORTABLE UNLOADING DEVICE

[76] Inventor: George F. Kuhn, Jr., 721 Harrison City Rd., Trafford, Pa. 15085

[21] Appl. No.: 121,604

[22] Filed: Sep. 14, 1993

[51] Int. Cl.⁵ ................................................ B60P 1/00
[52] U.S. Cl. .................................... 414/543; 212/135; 212/251
[58] Field of Search ............... 414/540, 541, 555, 542, 414/543; 294/67.21, 67.2; 212/133, 134, 135, 136, 137, 138, 139, 251

[56] References Cited

U.S. PATENT DOCUMENTS

| | | | |
|---|---|---|---|
| 360,578 | 4/1887 | Francis | 212/251 |
| 721,485 | 2/1903 | West et al. | 212/136 |
| 800,166 | 9/1905 | Morgan . | |
| 841,137 | 1/1907 | Fisher | 212/135 |
| 1,378,014 | 5/1921 | Eger . | |
| 1,931,700 | 10/1933 | Murphy et al. | 212/139 |
| 2,512,988 | 6/1950 | Adams . | |
| 2,535,961 | 12/1950 | Schutt | 212/135 |
| 2,696,310 | 12/1954 | Milewski | 212/135 |
| 3,063,574 | 11/1962 | Peterson | 212/135 |
| 3,333,883 | 8/1967 | Kikuchi . | |
| 3,578,179 | 5/1971 | Fujioka . | |
| 3,845,869 | 11/1974 | Sowers . | |
| 4,251,098 | 2/1981 | Belinsky | 294/67.21 |

Primary Examiner—Michael S. Huppert
Assistant Examiner—Thomas J. Brahan
Attorney, Agent, or Firm—Ronald S. Lombard

[57] ABSTRACT

A truck has been adapted to receive the unloading device of the present invention. The unloading device includes a removable rotatable jib frame which is mounted on the partition walls of the truck. An elongated hollow lever arm member is attached to the jib frame for unloading a load. The lever arm member utilizes a mechanical advantage for unloading a load. It incorporates a braking system together with a chain retraction system for ease in safety of operation.

11 Claims, 7 Drawing Sheets

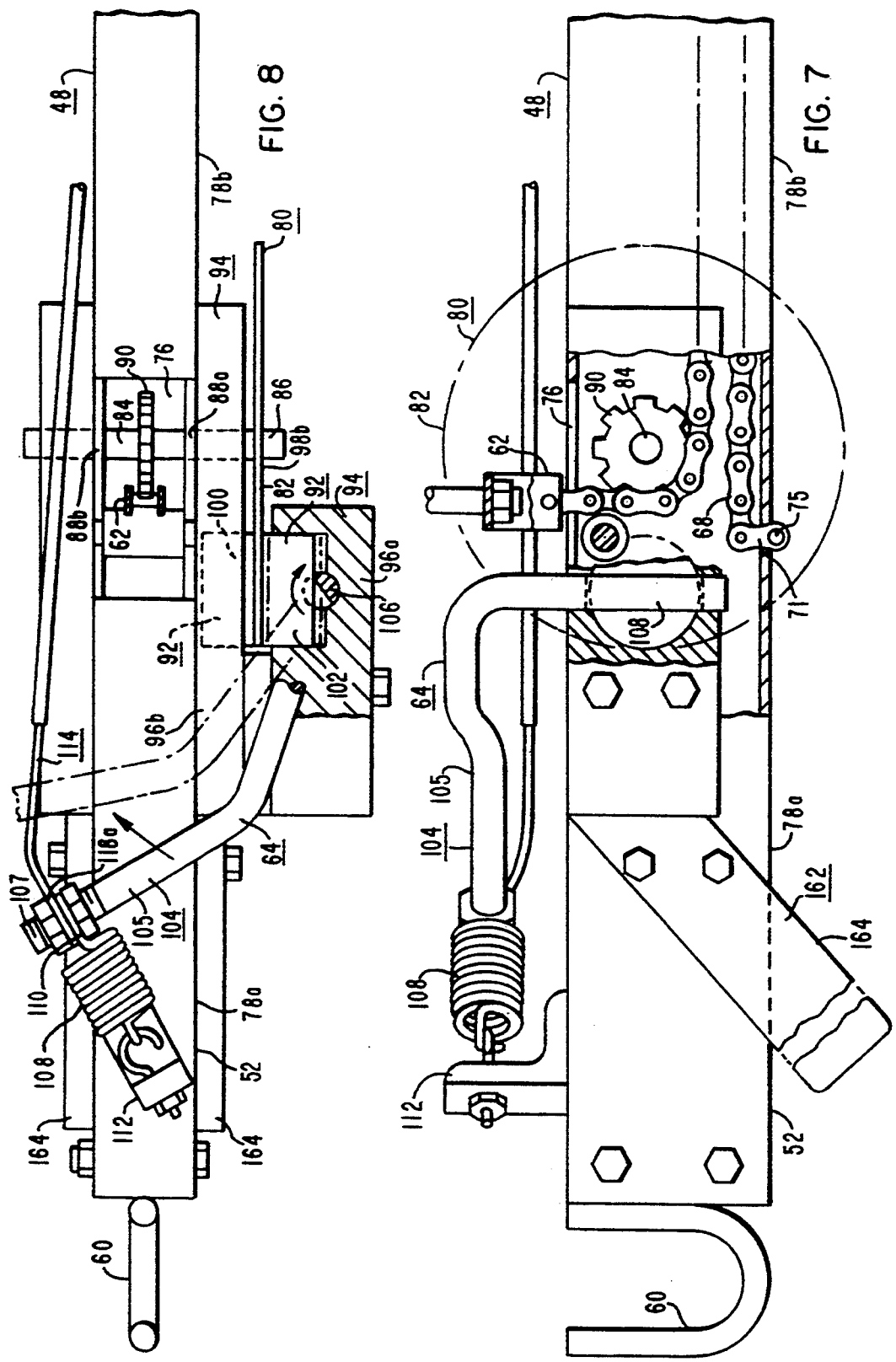

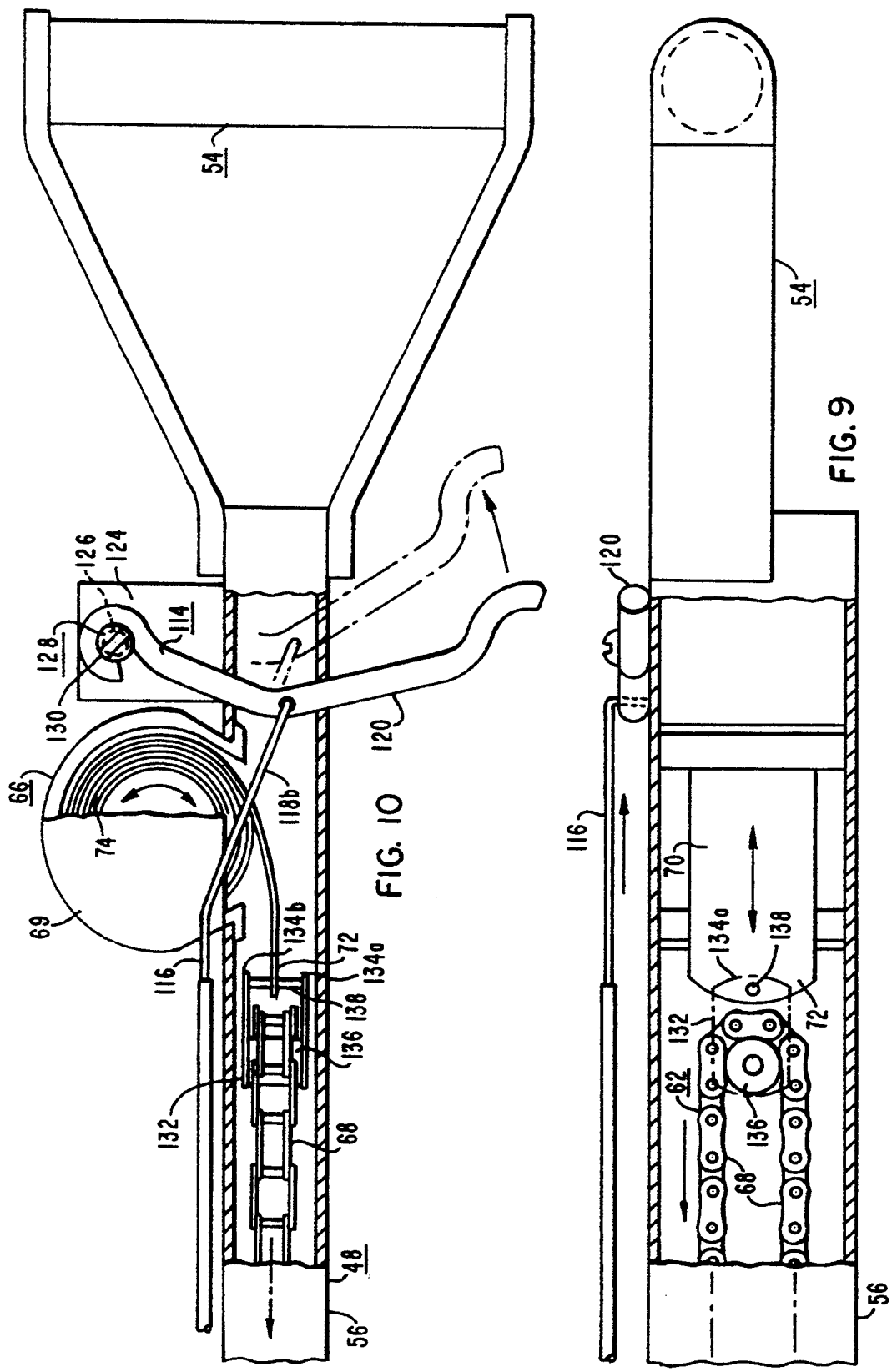

PORTABLE UNLOADING DEVICE

BACKGROUND OF THE INVENTION

The present invention relates to a portable unloading device and, in particular, to a portable unloading device for use in combination with a truck having a plurality of bays that has been adapted to receive the portable unloading device. An example of such a truck is a truck used for transporting beer kegs. The truck typically has a number of bays opening to the sides of the truck. Roll-away louvered doors are commonly used. A typical half-keg of beer weighs 160 pounds. The kegs are often loaded on pallets of 6 kegs, for example, stacked 3 pallets high in each bay. Other types of beverage trucks are loaded in a similar manner. Barrel beer is normally removed by hand from such a truck because of the weight of each keg and height the keg is stored, the unloading activity can be dangerous. The top pallet of barrels is especially dangerous because of the height which is typically 84 inches above ground level and the top of the barrel is 104 inches above ground level. Unloading beer barrels has often produced back and other injuries.

Various loading and unloading devices have been disclosed in the past, such as, U.S. Pat. No. 800,166 dated Sep. 26, 1905 issued to Ralph A. Morgan, discloses a motor truck utilizing a jib-crane pivoted at the side of the truck-platform and arranged to swing over the truck-platform to place loads thereon or remove them therefrom. In U.S. Pat. No. 1,378,014, dated May 17, 1921, issued to Lewis Eger is disclosed a loading device including a frame having guides with a carriage movable on the guides. The carriage is adapted to carry a barrel or other object. A lever is provided for raising the carriage and arranged to move over and partially around the carriage and the object carried thereby. In U.S. Pat. No. 2,512,988, dated Jun. 27, 1950, issued to Eli J. Adams, is a device for loading and unloading milk cans and the like to and from vehicles. The device comprises a pair of upright hollow tubular posts secured on opposite sides of a truck. Crane boom arms are provided which rotatably engage posts near the upper ends. A lifting cable is provided which extends down through the bore of a tube and through the floor and floor socket of the truck, then extends over a pulley which is rotatable about a shaft affixed to the other side of the truck body. The cable is then extended around another pulley which is rotatable on a pin extending vertically through the longitudinally movable piston shaft.

In U.S. Pat. No. 3,578,179, dated May 11, 1971, issued to Richard T. Fujioka, is disclosed a portable jib crane adapted for use with modular sealable ship containers. The ship crane of the Fujioka invention includes a support portion that has been adapted for cooperating with a corner casting of a conventional container. It also includes means at the lower part thereof adapted to engage opposite sides of the usual corner post portion of the container. In U.S. Pat. No. 3,845,869, dated Nov. 5, 1974, issued to Blane E. Sellers, is disclosed a portable loading and unloading device which includes a boom. Means are provided which are pivotally connected to the boom for securing the boom to the side wall of a cargo compartment. The means includes a first portion that is to be received in a complementary shaped recess adjacent to a row of vertically spaced perforations in the side wall of the truck and a second portion including a plurality of first elements for latching to the side wall remote from an access opening thereto and holding a first portion in the recess. The first and second hook elements each include a portion adapted to be laterally slidably received in predetermined perforations.

SUMMARY OF THE INVENTION

The present invention is provided in combination with a truck including a frame. The truck also includes a load containing body affixed to the frame. The body includes a truck bed affixed to the frame. Transverse partition walls are disposed in predetermined position within the body. The partition walls form a plurality of outwardly opening bays. Slidable doors are included for engaging the partition wall and covering the outwardly opening bays. The partition walls have a vertical U-shaped channel therein disposed on opposite sides thereof. The channels are for receiving rollers mounted to the slidable doors covering each bay.

The improvement of the present invention includes the partition walls being provided with wall apertures passing therethrough and opening into the oppositely disposed U-shaped channels. The improvement further includes a portable unloading device including a removable rotatable jib frame including vertical extensions. A first rotatable aperture engaging means is provided rotatably mounted proximate one end of the first vertical extensions. The first aperture engaging means slidably engages a first of the apertures. A second rotatable aperture engaging means is rotatably mounted proximate one end of the second of the vertical extensions. The second aperture engaging means slidably engages a second of the wall apertures. The first vertical extension and the second vertical extension are in coaxial alignment with one another.

The jib frame includes a first hook for carrying a load. An elongated hollow lever arm member is provided which includes means for engaging the load affixed proximate one end of the lever arm member. A lever arm handle is affixed proximate the other end of the lever arm. The lever arm member also includes controlled lever arm lowering means for engaging the first hook of the rotatable jib frame and for lowering the load in a controlled manner. Preferably, the means for engaging the load comprises a second hook.

The controlled lever arm lowering means desirably includes an extendable first hook engaging means for engaging the first hook. A brake is provided for controlling the descent of the elongated lever arm when lowering the load. Preferably the first hook engaging means comprises a chain of predetermined length housed within the hollow lever arm member.

Preferably the hollow elongated lever arm member has a fulcrum aperture passing therethrough in predetermined position. The extendable first hook engaging means passes through the fulcrum aperture. The fulcrum aperture divides the lever arm member into a first section and a second section, whereby when the lever arm is in operative position with the load, a mechanical advantage is achieved with respect to the load.

Retraction means is provided preferably including a first spring affixed at one end thereof to the first hook engaging means and at the other end thereof to the elongated hollow arm member. The first spring is extendable within the hollow arm member. The first spring desirably is a constant force spring.

Brake means are provided preferably comprising a disk brake rotor means including a rotor and a rotor shaft. The rotor is mounted proximate one end of the rotor shaft. The elongated lever arm member has rotor shaft receiving apertures therethrough. A chain sprocket is affixed to the rotor shaft at a predetermined position within the elongated arm. The chain sprocket is disposed in predetermined position to engage the chain. Brake puck means are provided for contacting the brake rotor when the brake is engaged. Brake puck housings are included for housing and supporting the brake puck means in predetermined position. The housing is affixed to the hollow arm member. The housing comprises a first housing disposed in predetermined position on one side of the disk brake rotor. The second housing is disposed in predetermined position on the other side of the rotor. Brake puck means comprises a stationary puck supported by the second housing in predetermined position in relationship to the disk brake rotor and a movable puck is supported by the first housing in predetermined position in relationship to the brake rotor. A brake engaging lever is provided for causing the movable brake puck to engage the brake rotor in a controlled manner. The brake engaging lever means includes a brake puck engaging lever supported in working relationship with the movable brake puck. The brake puck engaging lever has camming means disposed at one end of the brake puck lever proximate the movable brake puck. The camming means is for engaging and releasing the removable brake puck as the brake puck engaging lever is rotated. A brake lever spring is provided for applying a force to the brake puck engaging lever to cause the lever to normally contact the movable puck to inhibit the disk rotor from rotating. The brake lever spring is affixed at one end thereof to the brake puck lever proximate the other end thereof. A spring supporting means is provided for supporting and retaining the one end of the brake lever spring. A brake cable is provided for causing the camming means to release the movable brake puck to permit the brake rotor to rotate. The brake cable means comprises a brake cable which is affixed at one end to the brake puck engaging lever proximate the other end of the brake puck lever. Cable handle means is provided including a cable handle affixed in working relationship to the other end of the brake cable. A cable handle supporting means is included comprising a block member. The block member is affixed to the hollow arm member proximate the cable handle. The block member desirably has a cable handle aperture therethrough. A cable handle shaft is rotatably mounted in the cable handle aperture. The cable handle affixed to one end of the cable shaft.

The first hook engaging means preferably further includes a retraction spring chain retaining means. The retraction spring chain retaining means comprises a pair of side plate members, a chain roller, and a retraction spring engaging pin. The chain roller and the retraction spring are supported between the side plate members. The chain slidably engages the chain roller. The other end of the retraction spring is affixed to the retraction spring engaging pin.

The first rotatable aperture engaging means preferably comprises a first hinge. The first hinge desirable includes a first cylindrical collar. A first aperture engaging pin means is provided for slidably engaging the first aperture of the partition wall. A second aperture engaging pin means is provided for engaging the second aperture of the partition wall. The first aperture engaging pin means is rotatably mounted to the first cylindrical collar. The second aperture engaging pin means is rotatably mounted to the second cylindrical collar. The first cylindrical collar has one end of the first extension passing therethrough. The second cylindrical collar has the one end of the second extension passing therethrough.

The first aperture engaging pin has a threaded section proximate one end thereof. A hollow cad screw engages the threaded section. A cap screw engaging key is provided for engaging the cap screw and locking the pin into position during use of the rotatable frame. The cap screw engaging pin key has a predetermined width, whereby the key extends across the channel when the key is in the position. The key is provided with a key aperture passing therethrough. The key aperture has a lower portion sized to fit over the cap screw head. The key aperture has a smaller upper portion sized to lock the cap screw in place.

A first hook may, depending on the load, desirably include a removable scissor grappler for engaging a load lacking complementary hook engaging apertures. Load rotation inhibiting means for contacting the load when initially raising the load is preferably included. The load rotation inhibiting means preferably comprising load contacting legs.

BRIEF DESCRIPTION OF THE DRAWINGS

For a better understanding of the invention, reference may be had to the accompanying drawings exemplary of the invention in which:

FIG. 7 is an elevational view partially in section showing one end of the elongated hollow lever arm member;

FIG. 8 is a plan view partially in section showing the one end of the elongated hollow lever arm member;

FIG. 9 is an elevational view partially in section, showing the other end of the elongated hollow lever arm member;

FIG. 10 is a plan view partially in section, showing the other end of the elongated hollow lever arm member.

BRIEF DESCRIPTION OF THE PREFERRED EMBODIMENTS

Figure 1:
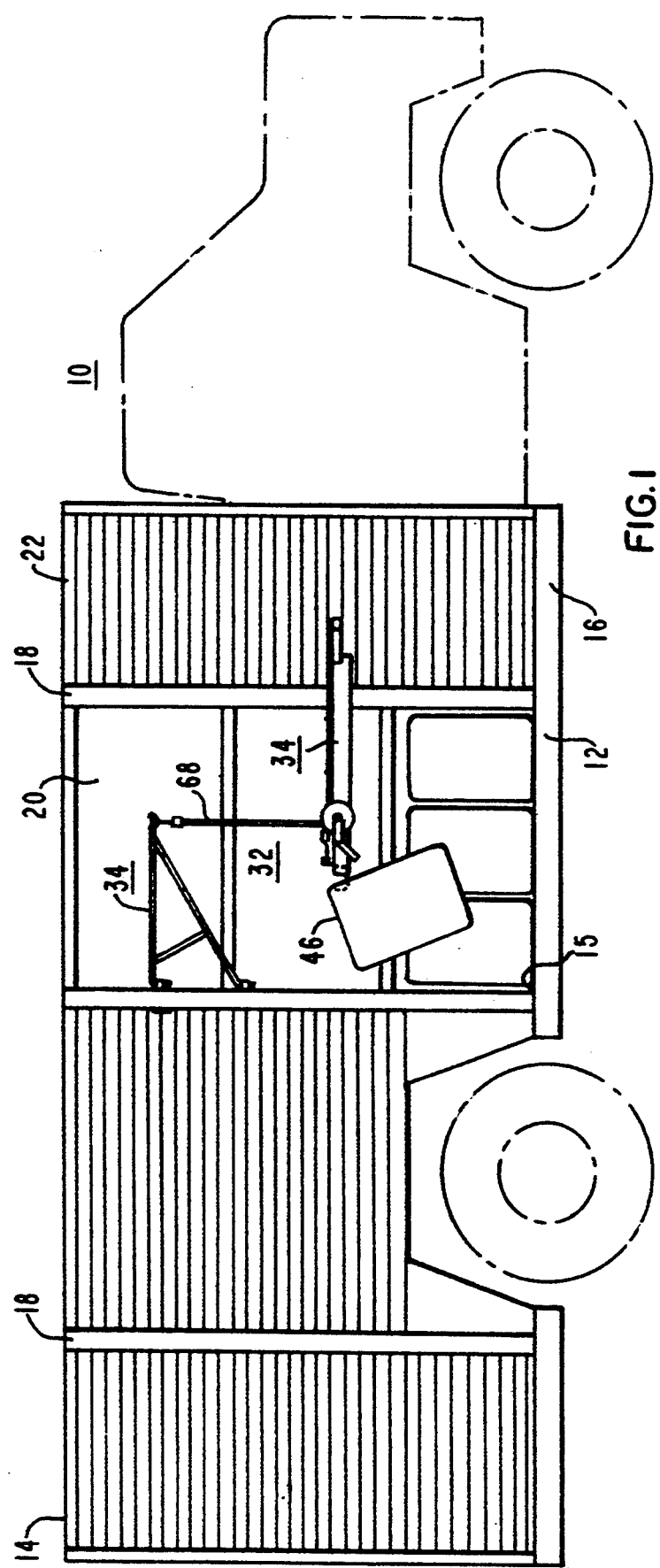
FIG. 1 is an elevational view of a typical truck holding beer kegs incorporating the improvement of the present invention.
Figure 3:
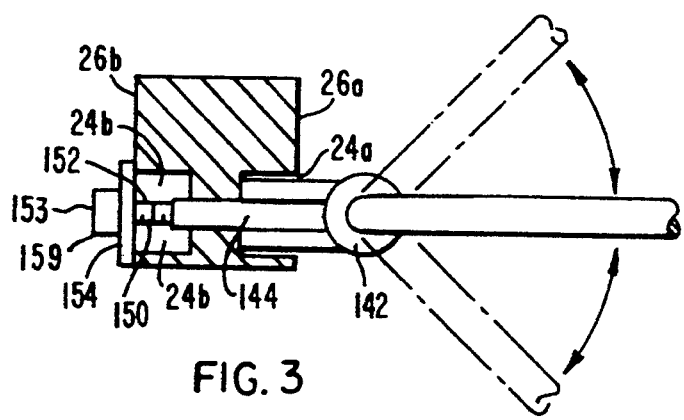
FIG. 3 is a cross-sectional view taken along the line 3—3 of FIG. 2.
Figure 3A:
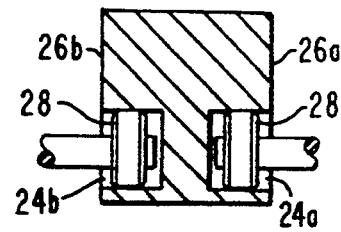
FIG. 3A is a cross-sectional view showing the position of the rollers in the channels.
Figure 4:
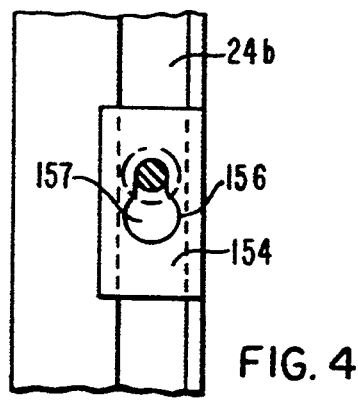
FIG. 4 is a side elevational view taken along the line 4—4 of FIG. 2.
Figure 5:
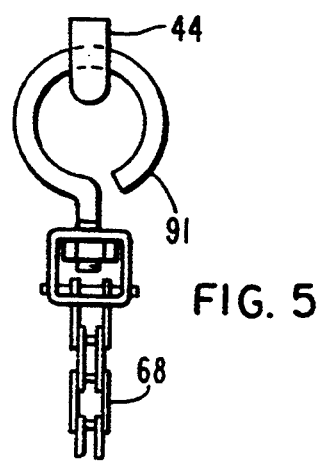
FIG. 5 is a side elevational view taken along the line 5—5 of FIG. 2.

The present invention is provided in combination with a truck 10 as shown in FIG. 1 including a frame 12. As stated previously, the present invention is applicable to trucks such as beverage trucks designed for carrying beer kegs and the like. They typically include in addition to the truck body frame 12 a load containing body 14 affixed to the frame 12. The body includes a truck bed 15 affixed to the frame. Transverse partition walls 18 are disposed in predetermined position as shown in FIG. 1. The partition walls 18 form a plurality of outwardly opening bays 20. Slidable doors 22 are provided for engaging the partition walls and covering the outwardly opening bays as desired. The partition walls 18 have vertical U-shaped channels 24a, 24b therein, as shown in FIGS. 3 and 3A. The vertical U-shaped channels are disposed on opposite sides 26a, 26b of the partition walls 18. The channels 24a, 24b are for receiving roller 28 of the slidable doors 22, as shown in FIG. 3A.

Figure 2:
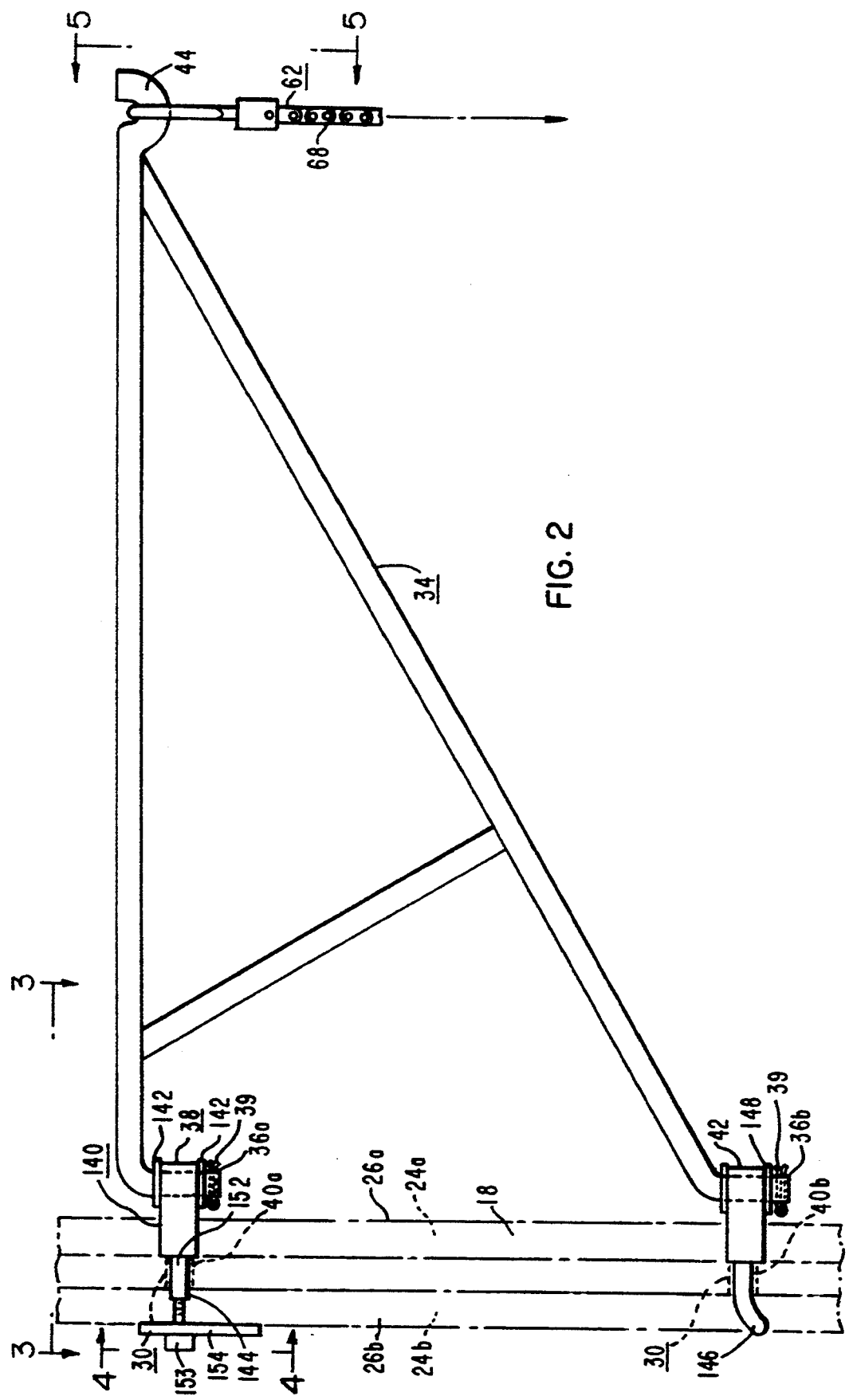
FIG. 2 is an elevational view of the removable rotatable jib frame shown in the mounted position with a partition wall.

The improvement of the present invention includes the partition walls 18 having wall apertures 30 passing therethrough opening into the oppositely disposed U-shaped channels 24a, 24b as shown in FIGS. 2 and 3. The improvement of the present invention also includes a portable unloading device 32. The portable unloading device 32 comprises a removable rotatable jib frame 34 including vertical extensions 36a, 36b. A first rotatable aperture engaging means 38 is provided. The first rotatable aperture engaging means 38 is rotatably mounted proximate a first of the vertical extensions 36a as shown in FIG. 2. The first aperture engaging means 38 slidably engages a first of the wall apertures 40a. A second rotatable aperture engaging means 42 is rotatably mounted proximate a second vertical extension 36b. A second aperture engaging means 42 slidably engages a second of the wall apertures 40b. The first vertical extension 36a and the second vertical extension 36b are in coaxial alignment with one another as shown in FIG. 2.

The jib frame 34 includes a first hook 44 for carrying a load 46. An elongated hollow lever arm member 48 is included. The elongated hollow lever arm member 48 include means 50 for engaging the load 46 as shown FIG. 6. The means 50 for engaging the load 46 is affixed proximate one end 52 of the elongated hollow lever arm member 48 as shown in FIGS. 7 and 8. A lever arm handle 54 is affixed proximate the other end 56. Controlled lever arm lowering means 58 for engaging the first hook 44 of the rotatable jib frame 34 and for lowering the load 46 in a controlled manner. Preferably, the means for engaging the load 50 includes a second hook 60 as shown in FIGS. 7 and 8.

Figure 6:
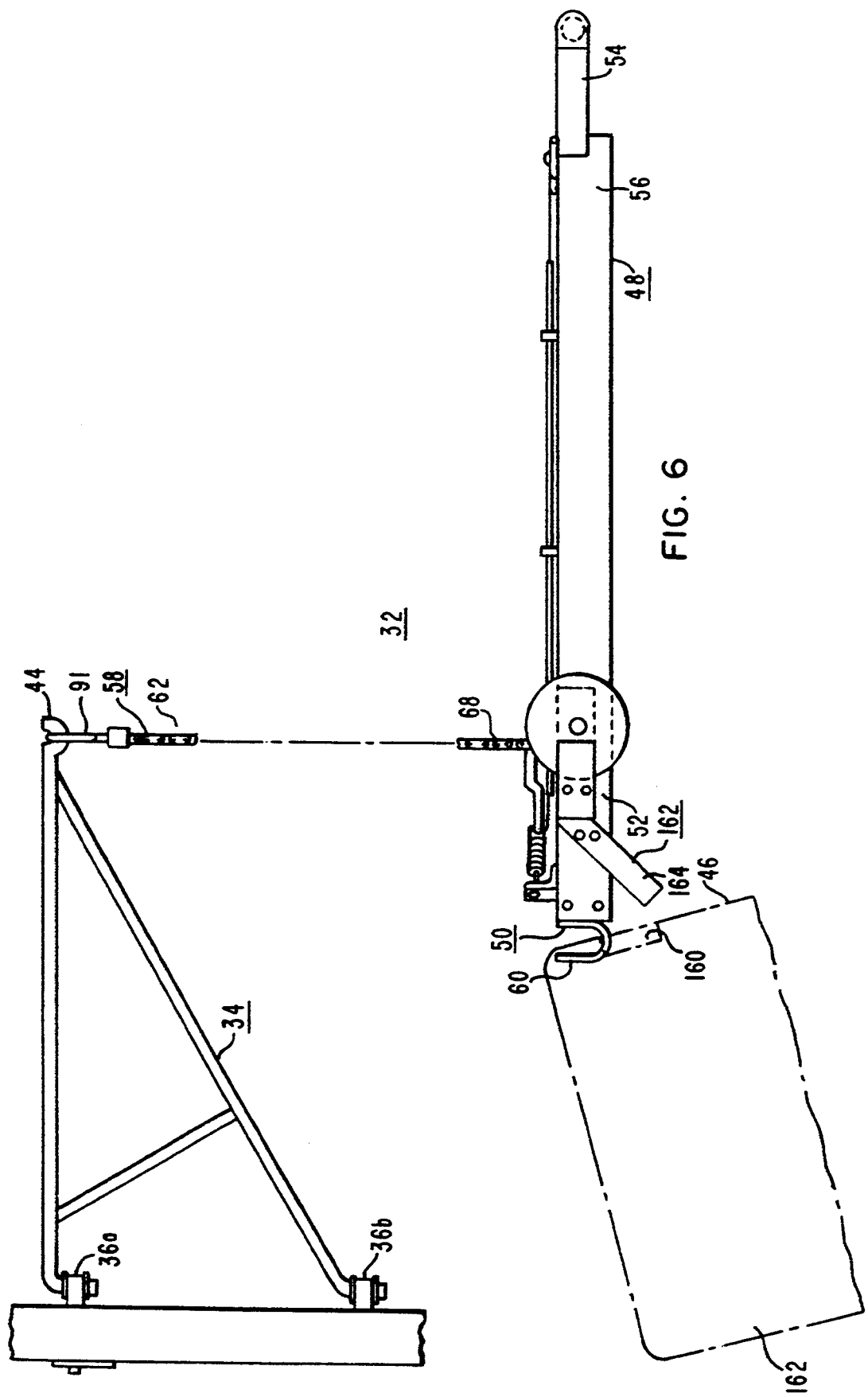
FIG. 6 is an elevational view of the portable unloading device of the present invention including the rotatable jib frame and the elongated hollow lever arm member.

The controlled lever arm lowering means 58 preferably includes extendable first hook engaging means 62 as shown in FIG. 6. Brake means 64 is provided for controlling the descent of the lever arm member and lowering the load 46 as shown in FIGS. 7 and 8. Preferably the hollow lever arm member 48 further includes a load retraction means 66 for retracting the first hook engaging means automatically when the hollow lever arm member is not supporting a load 46, as shown in FIG. 10.

Preferably the first hook engaging means 62 includes a chain 68 of predetermined length such as 84 inches. The chain 68 is housed within the hollow lever arm member. The last link 71 of the chain 68 extends through aperture 73 and is anchored by pin 75.

Preferably the retraction means 66 include a first spring 70 affixed at one end 72 thereof to the first hook engaging means 62. The other end 74 thereof is housed within spring housing 69. The spring 70 at the other end 74 simply retracts back into housing 69. The first spring 70 is extendable within the hollow arm member 48. The first spring, preferably is a constant force spring such as manufactured by Hunter Spring Products, 900 Cylmar Avenue, Sellersville, Pa., under the trademark Ne ator.

The elongated hollow lever arm member 48 has a fulcrum aperture 76 passing therethrough in predetermined position. The extendable first hook engaging means 62 passes through the fulcrum aperture 76. The fulcrum aperture 72 divides the lever arm member into a first section 78a and a second section 78b, as shown in FIGS. 7 and 8, whereby when the lever arm member 48 is in operating position with the load 46, a mechanical advantage is achieved with respect to the load 46. The lever arm member may be 60 inches, for example. The ratio of the length of the first lever arm member section 78a to the second lever arm member section 68b may be 1 to 6, for example.

The brake 64 preferably comprises a disk brake rotor means 80 including a rotor 82 as shown in FIGS. 7 and 8 and a rotor shaft 84. A rotor 82 is mounted proximate one end 86 of the rotor shaft 84. The elongated arm member 48 has rotor shaft receiving apertures 88a, 88d passing therethrough. The rotor shaft passes through the rotor shaft receiving apertures and is supported by the arm member 48. A chain sprocket 90 is affixed to the rotor shaft in predetermined position as shown in FIG. 8 within the elongated arm member. The chain sprocket 90 is disposed in predetermined position to engage the chain 68 as shown in FIGS. 7 and 8. Preferably the brake 64 also comprises brake puck means 92 for contacting the brake rotor 82 when the brake 64 is engaged. Brake puck housing means 94 is provided for housing and supporting the brake puck means 92 in predetermined position. The housing 94 is affixed to the hollow arm member 48 as shown in FIG. 8. The housing 94 includes a first housing 96a disposed in predetermined position on one side 98a, of the disk brake rotor 82 as shown in FIG. 8. A second housing 96b is disposed in predetermined position on the other side 98b for the disk brake rotor 82. The brake puck means 92 preferably includes a stationary puck 100 supported by the second housing 96b in predetermined position in relation to the disk brake rotor as shown in FIG. 8. A movable puck 102 is supported by the first housing 96a in a predetermined position in relationship to the brake rotor 82. A brake engaging lever means 104 for causing the movable brake puck 102 to engage the brake rotor 82 in a controlled manner. The brake engaging lever means 104 is supported in working relationship with the movable brake puck means 102. The brake puck lever means 104 has camming means 106 disposed at one end 108 thereof proximate the movable brake puck 102. The camming means 106 is for engaging and releasing the movable brake puck as the brake puck engaging lever is rotated. The brake engaging lever means 104 also includes the brake lever spring 108 for applying a force to the brake puck engaging lever 104 to cause the lever 104 to normally contact the movable brake puck 102 to inhibit the disk rotor from rotating. The brake lever spring 108 has affixed at one end 110a the brake puck lever 105. A spring supporting means 112 is included for supporting and retaining the one end 110 of the brake lever spring 108. The brake cable means 114 is included for causing the lever 105 to rotate and camming means 106 to release the removable brake puck 102 to permit the brake rotor 82 to rotate. The camming means 106 when rotated may move the movable puck 3/16 inch, for example. The brake puck lever may be 3 inches for example, which results in a 12 to 1 mechanical advantage ratio. The brake cable means 114 includes a brake cable 116 as shown in FIGS. 9 and 10. The brake cable 116 is affixed at one end 118a thereof to the brake puck engaging lever 105 proximate the other end 107 of the brake puck lever 105. A cable handle 120 is affixed in working relationship to the other end 118b of the brake cable 116. The cable handle supporting means 122 comprising a block member 124 is included. The block member 124 is affixed to the hollow arm member 48 proximate the cable handle 54. The block member 124 has a cable handle aperture 126. The cable handle shaft 128 is rotatably mounted in the cable handle aperture 126. The cable handle is affixed to one end 130 of the cable shaft 128.

Preferably the first hook engaging means 62 also includes a retraction spring chain retaining means 132 as shown in FIGS. 9 and 10. The retraction spring retaining means 132 includes a pair of side plate members 134a, 334b. A chain roller 136 is included together with a retraction spring engaging pin 138. The chain roller 136 and the retraction spring 138 are supported between the side plate members 134a, 134b. The chain 68 slidably engages the chain roller 136. The one end 72 of the first spring 70 is affixed to the retraction spring engaging pin 138. The first spring 70 is housed within spring housing 69. The spring 70 retracts into the spring housing 69. The other end 74 of spring 70 is free.

Preferably the first rotatable aperture engaging means 38 of the removable rotatable jib frame 34 comprises a first hinge 140 including a first cylindrical collar 142. The first aperture engaging pin 144 is included for slidably engaging the first aperture 40a of the partition wall 18. The second rotatable aperture engaging means 42 comprises a second aperture engaging pin 146 for engaging the second aperture 40b of the partition wall 18. The second aperture engaging pin 146 may be angled as shown in FIG. 2. The angled portion helps lock the jib 34 in place. The first aperture engaging pin 144 is rotatably mounted to the first cylindrical collar 142. The second aperture engaging pin 146 is rotatably mounted to the second cylindrical collar 148. The first cylindrical collar 142 has the first extension 36a passing therethrough. The second cylindrical collar 148 has the second vertical extension 36b passing therethrough. The first aperture engaging pin 144 has a hollow threaded section 150 as shown in FIG. 3 proximate one end 152 of the first aperture engaging pin 144. A cap screw 153 rotatably engages threaded section 150. The cap screw engaging key 154 is provided for engaging the cap screw and the first aperture engaging pin 144 in position during use of the rotatable jib frame. The cap screw engaging key 154 is a predetermined width, such as 2 inches whereby the key 154 lies across the channel 24b. The channels 24a, 24b are ¾ inch for example. A key aperture 156 passes through the key 154. The key aperture 156 has a lower portion 157 sized to fit over the head 159 of the cap screw 154. The key 154 has a smaller upper portion 61 sized to lock the cap screw in place. The cap screw 153 may be adjusted by rotating depending on the thickness of partition wall 18. Cotter keys 39 prevent the first and second vertical extensions 36a, 36b from coming out of the first and second collars 142, 148.

Preferably the first hook 44 further comprises removable scissor grappling means 158 for engaging a load lacking complementary hook engaging apertures.

Figure 11:
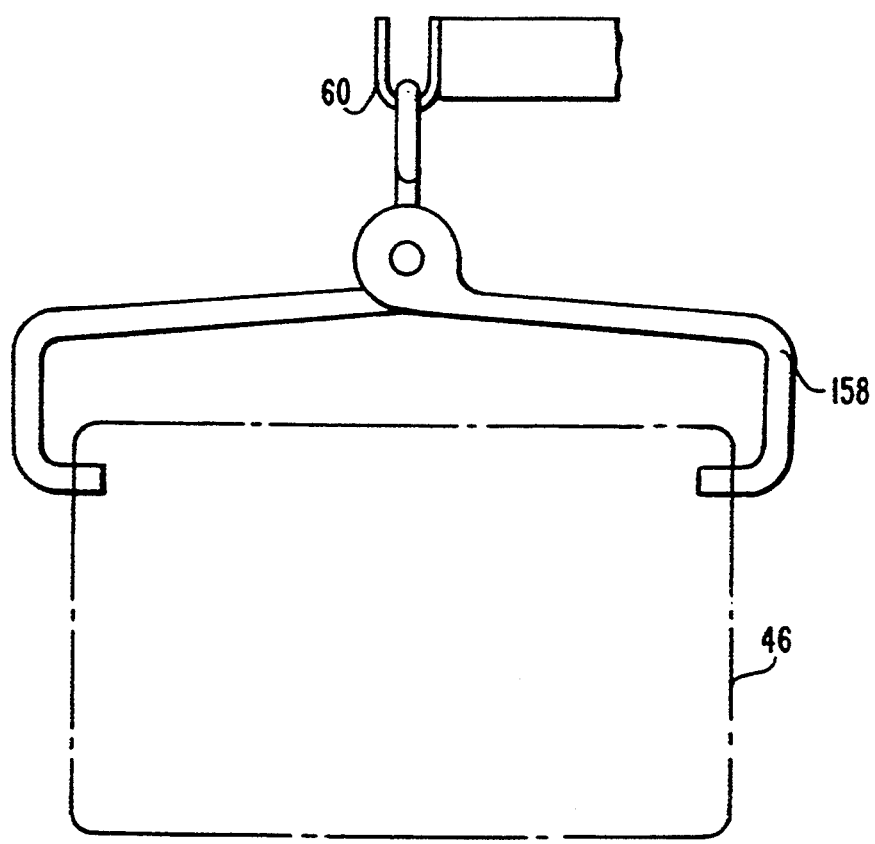
FIG. 11 is an elevational view of the first hock further including a removable scissor grappler.

The unloading device 32 of the present invention safely and efficiently removes loads such as barrelled beer from a truck. The elongated arm member 48 made principally of aluminum and is light in weight for ease in transportation by hand. The removable rotatable jib frame 34 may be made of tubular steel for example and is also light in weight and attaches easily to the truck 10 which has been modified in accordance with the present invention. As stated previously, in the past barrelled beer has generally been removed by hand without the aid of a mechanical device such as the present invention. The advantage of the elongated hollow arm member 48 of the present invention is that it takes advantage of a mechanical leverage principle for the operation so there is less chance of injury to the human body. A beer keg may be lifted with a force of 20 pounds using the present invention versus 160 pounds which is required when not using the present invention, for example. It also provides a decreased unloading time. The barrel 46 may be such as depicted in FIG. 6 having handle apertures 160 incorporated near the top 162 thereof. In the event that the barrel or other load being removed from the truck lacks the handle apertures for engagement by the second hook 60, the scissor grappling means 158 may be mounted on the second hook 60 as shown in FIG. 11 for removing the barrel or other load.

By way of example, the truck 10 may have outwardly opening bays 20 approximately 94 inches in height above the truck bed 16. The first aperture 40a may be installed in the partition wall in conformity with FIG. 2. The second aperture 40b is located in the partition wall approximately 16 inches below the first aperture. Another set of first and second apertures may be installed at a lower elevation in the partition wall to remove the middle pallet of kegs, for example. The other partition walls in the truck may be modified in the same manner. Thus far, it has been assumed that the slidable doors are roll-up type doors having rollers engaging the U-shaped channels 24a, 24b. If the truck does not have this type of door, the first and second rotatable aperture engaging means 38, 42 may be modified to attach to the partition walls 18.

To use the unloading device 32 of the present invention, insert the first and second rotatable aperture engaging means 38, 42 into the first and second apertures 40a, 40b as shown in FIG. 2. Key 154 is provided such that the key plate aperture 156 passing therethrough is such that the cap screw head 159 fits through the bottom portion 157 and then the key after passing over the cap screw head 159 can be locked in place by allowing the key 154 to drop on the cap screw 153.

Very often in a beer truck application, kegs are stacked on three levels using two pallets on top of each other in each bay 20. The top kegs are removed first with the jib frame 34 in place and the elongated arm member is then utilized. Eyelet 91 is mounted on first hook 44. The brake means of the present invention normally applies braking force to the disk rotor unless the cable handle is moved by the operator as shown by the arrow in FIG. 10. This feature of the invention is incorporated for reasons of safety so that the load may not inadvertently be dropped by accident. The operator must consciously engage lever 120 to permit the load to be released. As stated previously, a half keg of beer weighs 160 pounds and may cause injury if left to drop in an uncontrolled manner. Once the eyelet 91 is in place the second hook 60 of the lever arm 58 may engage the handle aperture 160 of the first keg to be removed. The extendable first hook engaging means 62 is normally in a retracted position as the keg is swung out from the bay 20 utilizing the rotation of the jib frame 34, the keg 46 may now be easily lowered by moving the cable handle and controlling it so that the keg or load may descend at the desired rate. The second hook 60 is then taken out of the handle aperture 160 upon the keg being lowered to the ground and the first hook engaging means 62 will retract back into the elongated arm 34. As stated previously, if the barrels or load do not have handle apertures 160, scissor grappling means 158 such as shown in FIG. 11 may be utilized. After all the barrels are unloaded from one bay 20, the jib frame may be moved to the next bay for unloading of that bay and so on.

The elongated hollow lever arm member 48 also further preferably includes load rotation inhibiting means 162 for contacting the load 46. The load rotation inhibiting means 162 includes load contacting legs 164 mounted as shown in FIGS. 6 and 7. The load contacting legs contact the load such as a beer keg when said keg is initially being lifted to prevent vertical rotation of the keg which would require the keg to be lifted a greater distance to clear a pallet. The load contacting legs are especially useful when removing kegs from the top pallet of the truck.

The unloading device 32 of the present invention may be adapted to uses other than with a truck as previously described. For example, it may be used in warehouses where loads such as wine barrels are stored on pallets. The jib frame of the present invention may be adapted to mount on a vertical support.

I claim:

1. In combination with a truck including a frame, a load containing body means affixed to said frame, said body means including a truck bed affixed to said frame, transverse partition wall means disposed in predetermined position within said body means, said partition wall means forming a plurality of outwardly opening bays, slidable door means for engaging said partition wall means and covering said outwardly opening bays, said partition wall means having vertical U-shaped channel means therein disposed on opposite sides thereof, said channel means for receiving said slidable door means, the improvement which comprises:

(a) said partition wall means having wall aperture means passing therethrough opening into said oppositely disposed U-shaped channel means;

(b) a portable unloading device comprising a removable rotatable jib frame means including vertical extension means, a first rotatable aperture engaging means rotatably mounted proximate a first of said vertical extension means, said first aperture engaging means slidably engaging a first of said wall aperture means, a second rotatable aperture engaging means rotatably mounted proximate a second of said vertical extension means, said second aperture engaging means slidably engaging a second of said wall aperture means, said first vertical extension means and said second vertical extension means in coaxial alignment with one another, said jib frame including a first hook means for carrying a load;

(c) an elongated hollow lever arm men%bet including means for engaging said load affixed proximate one end thereof, said hollow lever arm member further includes retraction means for retracting said first hook engaging means automatically when said hollow lever arm member is not supporting a load, lever arm handle means affixed proximate the other end of said hollow lever arm member, controlled lever arm lowering means for engaging said first hook means of said rotatable jib frame means and for lowering said load in a controlled manner, said controlled lever arm lowering means comprises extendable first hook engaging means for engaging said first hook means, brake means for controlling the descent of said hollow lever arm member when lowering a load.

2. The combination of claim 1, wherein said first hook engaging means comprises chain means of predetermined length housed within said hollow lever arm member.

3. The combination of claim 2, wherein said first hook engaging means further comprises a retraction spring and chain retaining means, said retraction spring and chain retaining means comprising a pair of side plate members, a chain roller, a retraction spring engaging pin, said chain roller and said retraction spring supported between said side plate members, said chain means slidably engaging said chain roller, said other end of said first spring means affixed to said retraction spring engaging pin.

4. The combination of claim 1, wherein said elongated hollow lever arm member has a fulcrum aperture means passing therethrough in predetermined position, said extendable first hook engaging means passing through said fulcrum aperture means, said fulcrum aperture means dividing said lever arm member into a first section and a second section, whereby when said lever arm men, bet is in operative position with a load a mechanical advantage is achieved with respect to said load.

5. The combination of claim 1, wherein said brake means comprises a disc brake rotor means comprising a rotor, a rotor shaft, said rotor mounted proximate one end of said rotor shaft, said elongated arm member having rotor shaft receiving apertures therethrough, said rotor shaft passing through said rotor shaft receiving apertures and supported by said arm member, a chain sprocket means affixed to said rotor shaft in predetermined position within said elongated arm member, said chain sprocket means disposed in predetermined position to engage said chain means, brake puck means for contacting said brake rotor when said brake means is engaged, brake puck housing means for housing and supporting said brake puck means in predetermined position, said brake puck housing means affixed to said hollow arm member, said housing means comprising a first housing disposed in predetermined position on one side of said disk brake rotor, a second housing disposed in predetermined position on the other side of said rotor, said brake puck means comprising a stationary puck supported by said second housing in predetermined position in relationship to said disk brake rotor, a movable puck supported by said first housing in predetermined position in relationship to said brake rotor, brake engaging lever means for causing said movable brake puck to engage said brake rotor in a controlled manner.

6. The combination of claim 5, wherein said brake engaging lever means comprises a brake puck engaging lever supported in working relationship with said movable brake puck means, said brake puck lever having camming means disposed at one end proximate said movable brake puck, said camming means for engaging and releasing said movable brake puck as said brake puck engaging lever is rotated, brake lever spring means for applying a force to said brake puck engaging lever to cause said lever to contact said movable puck to inhibit said disk rotor from rotating, said brake lever spring means affixed at one end thereof to said brake puck lever proximate the other end thereof, spring supporting means for supporting and retaining said one end of said brake lever spring means, brake cable means for causing said camming means to release said movable brake puck to per,nit said brake rotor to rotate, said brake cable means comprising a brake cable, said brake cable affixed at one end to said brake puck engaging lever proximate the other end of said brake puck lever, cable handle means comprising a cable handle affixed in working relationship to the other end of said brake cable, cable handle supporting means comprising a block member, said block member affixed to said hollow arm member proximate said cable handle means, said block member having a cable handle aperture therethrough, cable handle shaft means rotatably mounted in said cable handle aperture, said cable handle affixed to one end of said cable shaft.

7. The combination of claim 6, wherein said first aperture engaging pin has a threaded section therein proximate one end thereof, a cap screw for engaging said threaded section, a cap screw engaging key means for engaging said cap screw and maintaining said first aperture engaging pin in position during use of said rotatable jib frame means, said cap screw engaging key means having a predetermined width, wherein said key means lies across said channel when said plate is in position.

8. The combination of claim 1, wherein said retraction means comprises first spring means affixed at one end thereof to said first hook engaging means and at the other end thereof affixed to said elongated hollow lever arm member, said first spring means extendable within said hollow arm member.

9. The combination of claim 8, wherein said first spring means comprises a constant force spring.

10. The combination of claim 1, wherein said elongated hollow lever arm member further comprises load rotation inhibiting means for contacting said load when initially raising said load to inhibit rotation of said load.

11. The combination of claim 10, wherein said load inhibiting means comprises load contacting leg means.

* * * * *